United States Patent [19]
Uchida et al.

[11] Patent Number: 5,649,714
[45] Date of Patent: Jul. 22, 1997

[54] TOOL HOLDER

[75] Inventors: Teruhisa Uchida, Toyota; Takanori Hashimoto, Aichi-ken; Shigeaki Sato, Toyota; Koichi Sugiura, Toyota; Kenji Ueda, Toyota, all of Japan

[73] Assignee: Toyota Jidosha Kabushiki Kaisha, Toyota, Japan

[21] Appl. No.: 561,581

[22] Filed: Nov. 21, 1995

[30] Foreign Application Priority Data

Jan. 27, 1995 [JP] Japan ................................. 7-011119
Sep. 8, 1995 [JP] Japan ................................. 7-256797

[51] Int. Cl.$^6$ ........................................................ B23B 51/06
[52] U.S. Cl. ............................... 279/20; 408/57; 409/136
[58] Field of Search .............................. 279/20; 408/56, 408/57, 59; 409/136

[56] References Cited

U.S. PATENT DOCUMENTS 4,640,652  2/1987  Rivera, Jr. ........................... 409/136

FOREIGN PATENT DOCUMENTS

| | | |
|---|---|---|
| 0 350 725 | 1/1990 | European Pat. Off. . |
| 0 618 030 | 10/1994 | European Pat. Off. . |
| 2 2131 34 | 8/1974 | France . |
| 16 02 750 | 12/1970 | Germany . |
| 32 43 112 | 7/1983 | Germany . |
| 3814565 | 7/1989 | Germany ................. 408/57 |
| 39 32 522 | 4/1990 | Germany . |
| 90 03 903.3 | 7/1990 | Germany . |
| 3-29058 | 6/1991 | Japan . |
| 5-16109 | 3/1993 | Japan . |
| 5-16111 | 3/1993 | Japan . |

*Primary Examiner*—Steven C. Bishop
*Attorney, Agent, or Firm*—Oblon, Spivak, McClelland, Maier & Neustadt, P.C.

[57] ABSTRACT

A tool holder holding in a fluid supply hole $3d$ having an inner diameter a tool 1 having the diameter of identical with or smaller than said inner diameter through a collet 2, wherein a fluid can be supplied from the fluid supply hole $3d$ to a fluid channel $1c$ of the tool 1, in the fluid supply hole $3d$, a seal block 11 as a regulating means which regulates a flowing amount of the fluid to the fluid channel $1c$ of the tool 1 and the flowing amount of the fluid to the gap between the fluid supply hole and the tool 1 is provided slidably in the longitudinal direction of the fluid supply hole. The seal block 11 adheres close to the end of the tool 1 due to the fluid pressure in the fluid supply hole $3d$ and the fluid is supplied to the close adhesion portion, thereby the fluid flowing amount to the channel $1c$ of the tool 1 can be regulated.

9 Claims, 14 Drawing Sheets

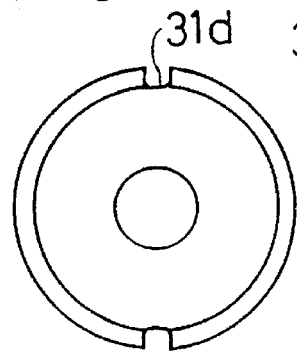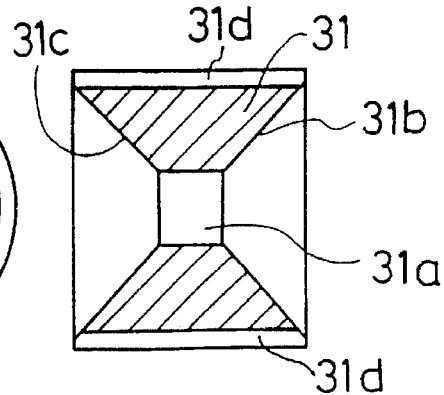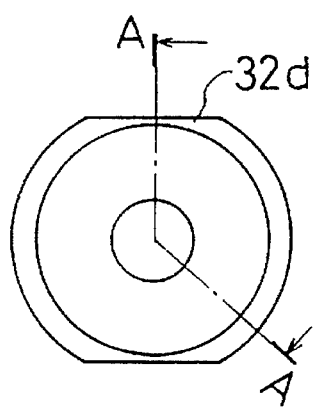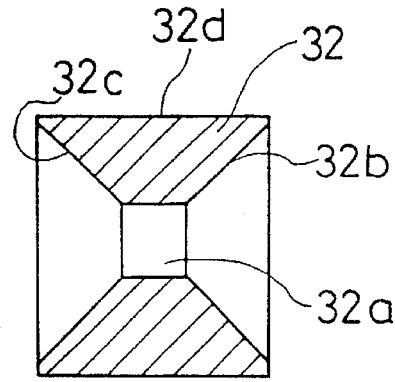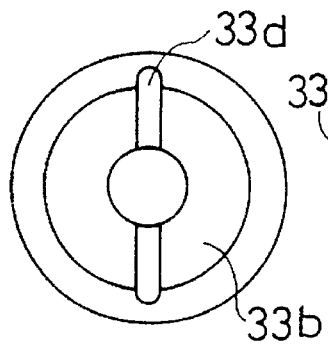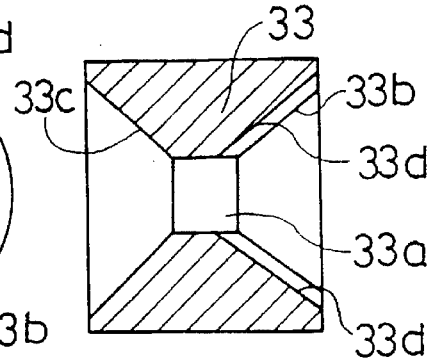

TOOL HOLDER

BACKGROUND OF THE INVENTION

1. Field of the Invention

The present invention relates to a holder for holding a tool of the type in which fluid such as cutting oil, coolant, and mist including air and coolant is spouted to a workpiece to be worked through a fluid channel located at the tip end or nearby.

2. Description of the Related Art

When doing cutting process effectively such as boring, it is necessary to supply the portion of the workpiece to be worked with the cutting oil sufficiently. Such tools and tool holders as shown in FIG. 16 are known as such which supplies cutting oil etc. to the workpiece particularly on the portion to be worked from the tip end of the tool through a fluid channel provided inside the tool.

In this prior art, the tool holder portion of the tool holder is constituted from a collet 22, a tip end opening 23a of a quill 23 and a rock nut 24. The collet 22 comprises a tip portion 22a and a rear end 22b both tapered on the outer circumference, and several split grooves are provided in an axial direction of the collet to reduce its diameter. The inner surface of the tip end opening 23a is formed in a tapered manner and the outer circumference thereof is provided with a male screw 23b. The inner surface 24a of the tip of the rock nut 24 is formed in a tapered manner and the inner surface of the rear end is tapped to form a female screw 24b.

A straight shank portion 21b of an oil-through-drill 21 is coupled with the tip end opening 23a of the quill 23 through the collet 22. The rock nut 24 abuts against the tip end 22a of the collet 22 on the inner surface 24a of the tip end, and by a female screw 24b it screws together with male screw 23b. Since the collet 22 and the rock nut 24 abut against the surface 24a of the tip end, in accordance with the screwed amount of the rock nut 24 into the tip end opening 23a of the quill 23, the rear end 22b of the collet 22 is coupled with the inner side of the tip end opening 23a of the quill 23. Since the inner surface of the tip end opening 23a of the quill 23 is formed in a tapered manner, the collet 22 coupled inside is reduced in its diameter by being reduced in the spacing between the grooves of the plurality of split grooves provided in an axial direction.

The straight shank 21b of the oil-through-drill 21 has a diameter identical with the inner diameter or less of the fluid supply hole 23e of the quill 23, which is clamped with the collet 22 along with the reduction of the diameters of the tip end 22a and the rear end 22b of the collet 22, so that the oil-through-drill is fastened inside the fluid supply hole 23e of the quill.

When a tapered shank portion 23c of the quill 23 is coupled with a main shaft 25, the quill 23 is withdrawn inside the main shaft 25 through a pull stud 26 screwed in the female screw 23d and fixed. Since the oil-through-drill 21 has a fluid channel 21c therein and the quill 23 and the pull stud 26 are provided with fluid supply holes 23e and 26a respectively, when the quill 23 is withdrawn inside the main shaft 25 and fixed, a supply tube 27 of the main shaft 25, the fluid supply holes 26, 23e and the fluid channel 21c are in communication with each other and the fluid such as cutting oil is spouted from the tip end 21a of the tool.

When the fluid such as cutting oil is supplied from the supply tube 27 in the main shaft, the pressure of the fluid such as cutting oil is increased, from, for instance, a gap between the fluid supply hole 23e and the straight shank 21b of the oil-through-drill 21 and the gap which belongs to the tool holding elements such as a plurality of split grooves provided on the collet 22, a great amount of cutting oil under increased pressure leaks, so that a given amount of fluid can not be spouted from the tip end 21a.

Further, also, a great amount of the highly pressurized fluid such as cutting oil supplied to the fluid supply hole of the tool holder leaks from the gaps, which may occur between the tools and the collet gap due to the close adhesion malfunction between the constitutional elements of tool holding portion of a tool holder such as between the straight shank 21b of the oil-through-drill 21 and the collet 22 which abuts against the shank 21b or between the collet 22 and the tapered surface of the tip end opening 21a of the quill 23 as a tool holder, so that there may occur a shortage of the fluid to be spouted from the tip end 21a of the tool.

As a tool holder which may prevent such cutting oil from leaking, what uses in a tool holder an oil seal packing to touch the opening for fluid channel of a tool is known as disclosed in Japanese Utility Model laid-open No. Hei 5-16109. This oil seal packing 50 is shown in FIG. 17.

The oil seal packing is configured like a hat, the tip end 50a of which provides an opening 50b. The tip end 50a touches the end of the oil-through-drill 21, and an annular circumferential trailing end 50c adheres to the fluid supply hole 23e. And when the oil seal packing is pressured by the fluid from the hole 23e, the circumference of the trailing end 50c adheres closely to the inner surface of the quill 23 adjacent to the fluid supply hole 23e and the tip end 50a adheres closely to the inner surface of the collet 22 adjacent to the end of the oil-through-drill 21. So that the leak of the fluid from the slit grooves is prevented.

Further, as shown in FIG. 18, there is known a type in which the outer circumference of an oil seal packing 28 and the inner surface of a fluid supply channel 29 are threaded, thereby the mounting position of the oil seal packing 28 can be regulated so as to make the packing to adhere closely to the end 31 of a tool where the fluid channel path is opened.

However, those conventional arts have the following defects.

First, the oil seal packing 50 shown in FIG. 17 is limited in its mounting position due to the collet 22, so that the position of the oil seal packing can not be regulated. Accordingly, when fitting a tool, the end of the tool has to adhere precisely to the oil-seal-packing. Further, before fastening the oil-through-drill 21, if a little fluid leaking occurs and that leaked fluid attaches on the slit grooves of the collet 22, those slits may collect cut chips and some dusts. And when replacing such oil-through-drill 21, it becomes necessary to wash it. In addition, to avoid such collection, some precautions are needed, such as covering the tool with a dust cover to prevent outer things from being adhered.

Further, in the type of packing 28 as shown in FIG. 18, since the mounting position of an oil seal packing can not be regulated after the assembly of a tool to a tool holder, it is necessary to accord the tool end where the fluid channels are opened with the abutting position of the oil seal packing. That is, if a seal member such as oil seal packings is not precisely positioned to and abutted under an appropriate force on a tool end, the fluid leaks from the gap between the seal member and the tool end and is deposited in the space formed by the seal member and the tool holding portion of the tool holder, it flows out excessively from the gaps between the constitutional elements such as the ones between the collet and tool or between the collet and the tool holder. In addition, even if the positioning is carried out successfully, there may remain still such problems as explained in connection with FIG. 17.

SUMMARY OF THE INVENTION

The present invention has been made in the light of the above problems, and the objects thereof are to prevent from unnecessary leaking of the fluid from the gaps which the constitutional elements of the tool holding portion have or which are formed in the constitutional elements between the tool and the tool holding portion by pressing a seal member in a fluid supply hole against the end of the tool where fluid channels are opened, making the highly pressurized fluid supplied in the tool holder in communication with a fluid channel of a tool and sealing the inner surface of the fluid supply hole and the end of the tool, and to secure a necessary supply amount of fluid to the end of the tool and if necessary to supply a regulated amount of fluid to said gaps.

According to a first aspect of the invention to attain the above objects, a tool holder, which holds a tool at the end opening connected to the fluid supply hole having a given inner diameter through a collet and can supply the fluid to the supply channels of the tool from said fluid supply hole, comprises in the fluid supply hole a regulator which regulates an amount of fluid flowing to said fluid channels of the tool and an amount of fluid flowing to the gap between the inner surface of the fluid supply hole and the outer surface of the tool.

Further, according to a second aspect of the invention to attain the above objects, said regulator defined in the first aspect of the invention is a seal member which abuts against the end of said tool in said fluid supply hole by free sliding in the longitudinal direction in the fluid supply hole due to the pressure of the fluid supplied into the fluid supply hole and also against the inner surface of the fluid supply hole.

Furthermore, according to a third aspect of the invention to attain the above objects, said regulator defined in the first aspect of the invention is a seal member having a main channel to supply the fluid to the channels of the tool and at least one of said member and said tool holder is provided with a bypass to introduce the fluid to the gap between the inner surface of the fluid supply hole and the outer surface of the tool.

Still further, according to a fourth aspect of the invention to attain the above objects, said tool holder defined in any one of the second and the third aspects of the invention is provided with a pressure reducing means which prevent the pressure increasing due to the volume reduction of the space formed with the seal member and the tool holding portion of the tool in accordance with the sliding of the seal member.

Furthermore, according to a fifth aspect of the invention to attain the above objects, said seal member of the tool holder defined in any one of the second through fourth aspects is provided with a diameter-expandable portion which expands due to the pressure of the fluid acting on the seal member and comes close to the inner surface of the fluid supply hole.

Further, according to a sixth aspect of the invention to attain the above objects, an outer diameter portion of the seal member of the tool holder defined in any one of the second through the fifth aspects is provided with a projection having a diameter larger than the diameter of the fluid supply hole.

Each means mentioned above functions as follows, respectively.

In the tool holder according to the first aspect of the invention, due to the regulator which regulates the proportion between the flow amount of the fluid from the fluid supply hole to the fluid channels and the flow amount flowing to the gap between the inner surface of the fluid supply hole and the outer surface of the tool, a necessary amount of fluid to the tip end of the tool is secured, in addition if necessary, a necessary flow amount of the fluid may be supplied to the gaps such as between the elements of the tool holding portion or between the elements of the tool and the tool holding portion.

In the tool holder according to the second aspect of the invention, upon receiving the fluid pressure, the seal member abuts against the end of the tool and also against the inner surface of the fluid supply hole, thereby said fluid is supplied to the fluid channels of the tool and a necessary fluid amount to the tip end of the tool is secured.

In the tool holder according to the third aspect of the invention, since the seal member comes close to the end of the tool in the fluid supply hole and said fluid is supplied to the fluid channels of the tool, it becomes possible to secure the necessary fluid amount to the end of the tool, and further, due to the bypass provided on at least either one of the seal member or the tool holder, a necessary amount of the fluid is supplied also to the gap between the inner surface of the fluid supply hole and the outer surface of the tool.

In the tool holder according to the fourth aspect of the invention, since the pressure reduction means can prevent the increasing of the pressure due to the reduction of the volume of the space formed with the seal member and the tool holding portion of the tool holder in accordance with the sliding of the seal member in the fluid supply hole of the tool holder, the pressure increased due to the volume reduction of the volume overwhelms the supply pressure of the fluid, thereby the sliding of the seal member is affected little due to the fluid supply to increase the close adhesion between the seal member and the end of the tool.

Further, in the tool holder according to the fifth aspect of the invention, after the close adhesion of the seal member to the end of the tool by sliding in the fluid supply hole, an end face of the seal member is expanded in diameter due to the supplied fluid pressure acting thereon, thereby the close adhesion between the inner surface of the fluid supply hole and the expanded diameter portion of the seal member is increased.

Finally, in the tool holder according to the sixth aspect, since there is provided with a projection having a diameter larger than the fluid supply hole on the outer surface of the seal member, such projection is biased against the inner surface of the fluid supply hole strongly more than other portions. Further, with said projection the close adhesion is secured between the inner surface of the fluid supply hole, which allows rather larger clearance of the dimension of the projection and the portions other than such projection.

BRIEF DESCRIPTION OF THE DRAWINGS

FIG. 9 is a schematic view of the second embodiment of the seal block according to the present invention, (a) shows an operation side thereof, and (b) shows it in section.

FIG. 10 is a schematic view showing a variation from the second embodiment, (a) shows a view from the operation side and (b) shows a sectional view along A—A line of (a).

FIG. 11 is a schematic view of a further variation of the seal block of the second embodiment, (a) shows its abutting side and (b) shows its sectional view.

DETAILED DESCRIPTION OF THE PREFERRED EMBODIMENT

The embodiments of the present invention will be explained hereinafter based on plural number of embodiments.

Figure 1:
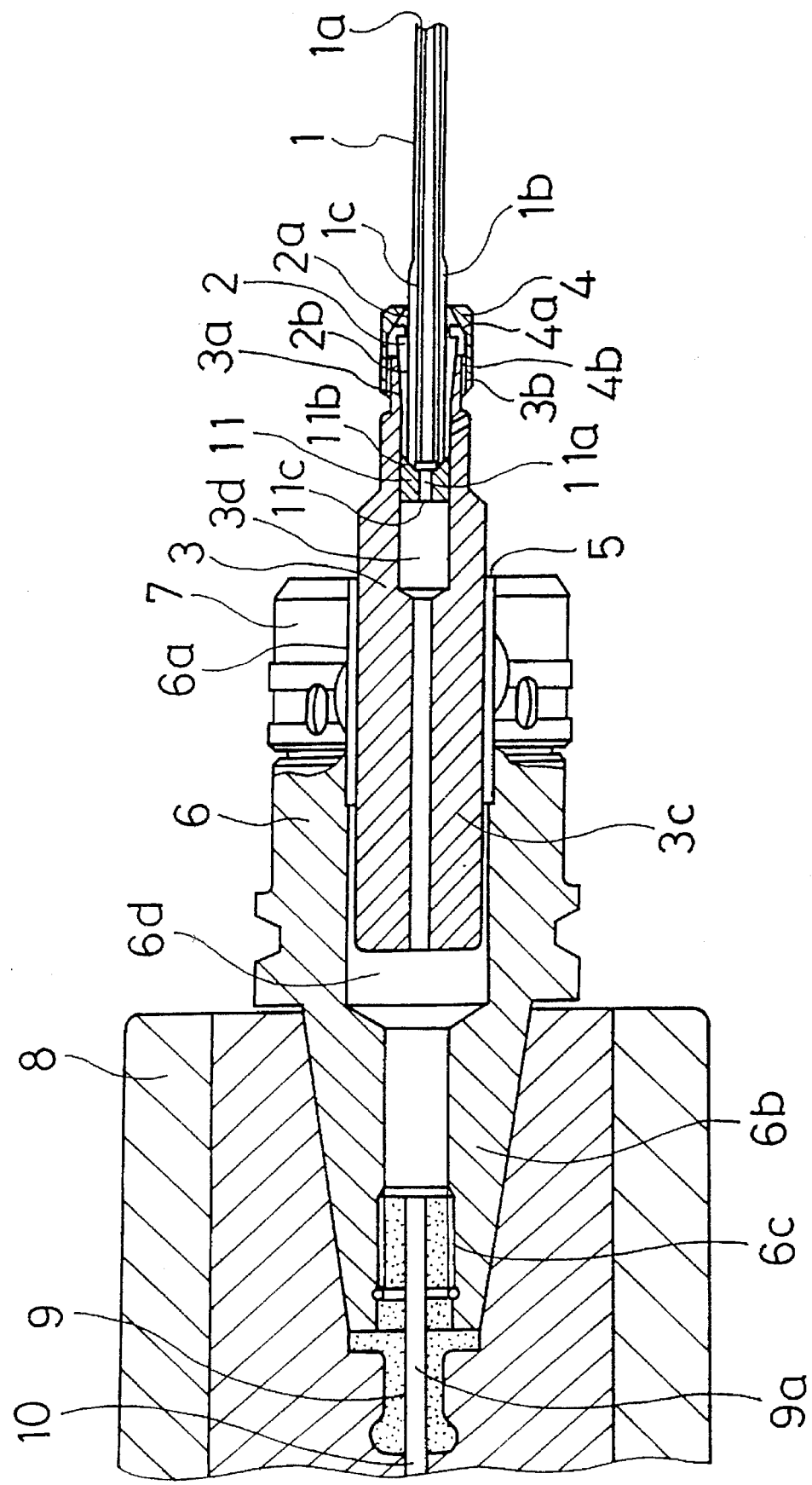
FIG. 1 is a schematic view of the setting status of a seal block of a tool holder in section according to the first embodiment of the present invention.
Figure 2:
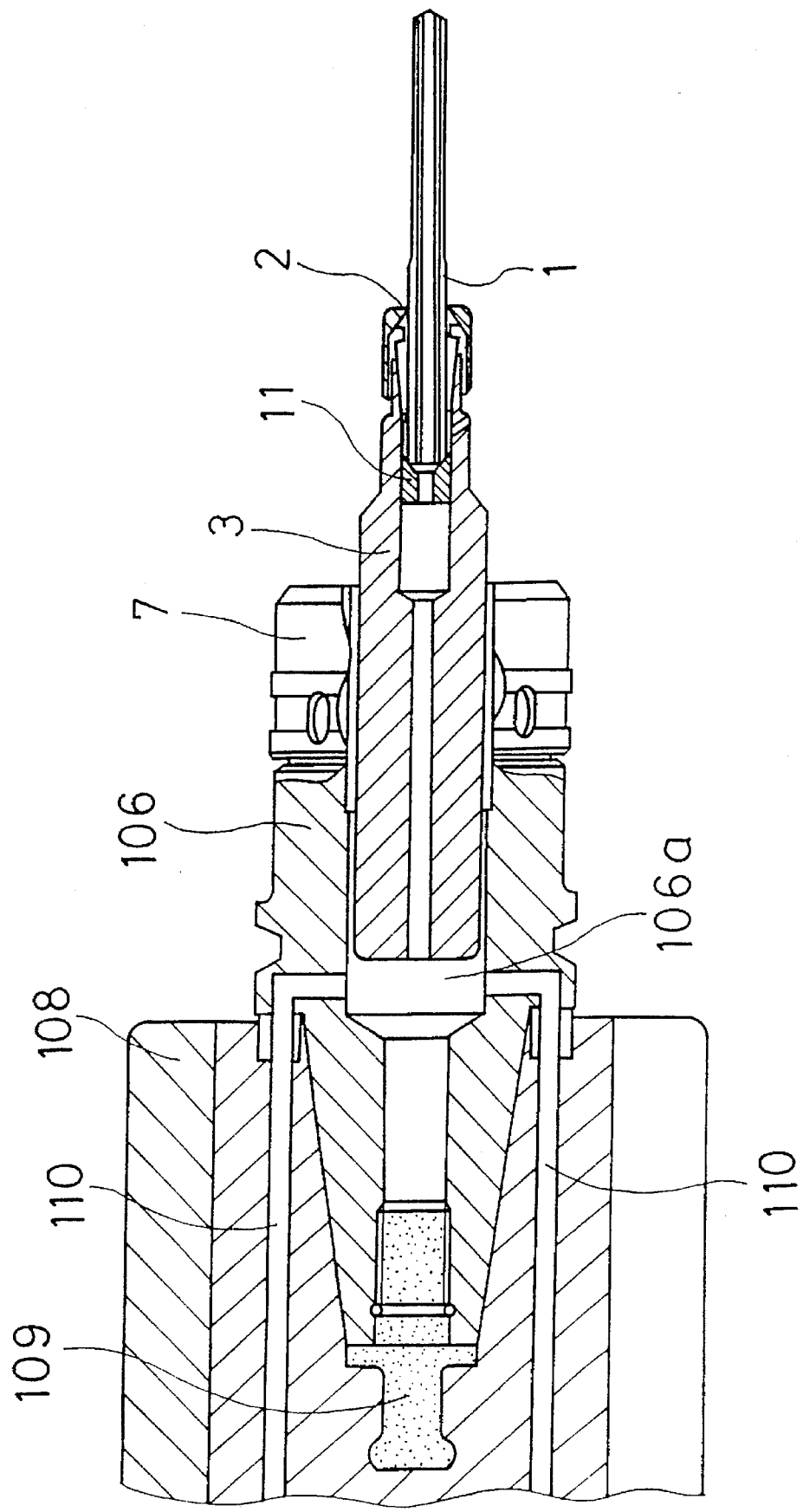
FIG. 2 is a schematic view of the setting status of a seal block of a tool holder in section according to the first embodiment of the present invention.

First, the following is the first embodiment of the invention. FIGS. 1 and 2 illustrate an outline of the tool holder in which the present invention is worked. The tool holding portion of this tool holder is constituted with a collet 2, the tip end opening 3a of a drill chuck 3. The collet 2 comprises a tip end portion 2a, the outer surface of which is formed in a tapered manner toward the tip and a rear portion 2b, the collet 2 is provided with several split grooves along the axial direction of the collet 2 in order to reduce its diameter. The inner surface of the tip end opening 3a of the drill chuck 3 is formed in a tapered manner, on its outer surface of the tip end opening 3a a male screw 3b is threaded. The inner surface 4a of the tip end of a lock nut 4 is formed in a tapered manner, and on the inner surface of the rear portion a female screw 4b is threaded. The straight shank portion 1b of the oil-through-drill 1 is coupled with the tip end opening 3a of the drill chuck 3 as a tool holder through the collet 2. The lock nut 4 abuts against the tip end portion 2a of the collet 2 with its inner surface 4a, and the female screw 4b engages with the male screw 3b of the drill chuck 3. Since the collet 2 and the lock nut 4 abuts against each other with the tip end portion 2a and the inner surface 4a of the tip end portion of the lock nut 4, in accordance with the screwed stroke of the lock nut 4 into the tip opening 3a of the drill chuck 3, the rear end portion 2b of the collet 2 is inserted into the inner side of the tip end opening portion 3a of the drill chuck 3. Since the inner surface of the tip end opening 3a of the drill chuck 3 is formed in a tapered manner, the collet 2 to be inserted inside the collet 2 is reduced in its diameter by narrowing the split width of the plural grooves.

The diameter of the straight shank 1b of the oil-through-drill 1 is identical with or smaller than the inner diameter of the fluid supply hole 3d, but it is clamped with the collet 2 in accordance with the diameter reduction of the tip end 2a of the collet 2 and the rear end portion 2b and the oil-through-drill 1 is fastened inside the fluid supply hole 3d of the drill chuck 3. Accordingly, between the straight shank 1b and the fluid supply hole 3d, a gap by the diameter difference between the straight shank 1b and the fluid supply hole 3d is formed. The drill chuck 3 is coupled with a quill 6 in the straight shank 3c through a collet 5, and the drill chuck 3 is fastened on the quill 6 by a lock nut 7 which is screwed in the outer screw portion 6a of the quill 6. When a taper shank 6b of the quill 6 is coupled with a main shaft 8, the quill 6 is drawn into the main shaft 8 through a pull stud 9 screwed in a female screw 6c of the rear end of the quill 6 and fastened.

The oil-through-drill 1 has a fluid channel 1c inside, and the drill chuck 3, the quill 6 and pull stud 9 are provided with the fluid supply holes 3d, 6d and 9a respectively, thereby, when the quill 6 is drawn in the inside the main shaft 8 and fastened, a supply tube 10 inside the main shaft is in communication with the fluid supply holes 9a, 6d, 3d and the fluid channel 1c and a cutting oil can spout from the tip end 1a of the tool.

The present embodiment is explained based on a fluid supply system in which, as shown in FIG. 1, a fluid is supplied from the supply tube 10 within the main shaft 8 to the fluid supply hole 6d of the quill 6 through the fluid supply hole 9a of the pull stud 9, but it may be a fluid supply system in which, as shown in FIG. 2, a fluid is supplied from the supply tube 110 within the main shaft 108 to the fluid supply hole 106d of the quill 106. Here, the similar members or parts as well as in the fluid supply system described in FIG. 1 are designated by the identical signs and the explanations thereof are omitted. Further, in this embodiment, as a tool holder a case where a drill chuck shown in FIGS. 1 and 2 is used, it may be a quill shown in FIG. 7 as a tool holder in place of a drill chuck.

In the fluid supply hole 3d of the drill chuck shown in FIG. 1, a seal block 11 as a regulator means to regulate the proportion of the flowing amount between the fluid amount flowing into the fluid channel 1c of the oil-through-drill 1 and the fluid amount flowing into the gap portion between the fluid supply hole 3d and the straight shank portion 1b of the oil-through-drill 1, is provided slidably toward an axial direction of the fluid supply hole 3d. The outer configuration of the seal block 11 is approximately identical with the inner shape of the fluid supply hole, and the dimension of the outer circumference of the seal block is approximately identical with the dimension of the inner surface of the fluid supply hole. In this embodiment, the fluid supply hole and the seal block are circle in section and the outer dimension of the seal block is a little smaller than the dimension of the inner circumference of the fluid supply hole.

Figure 3:
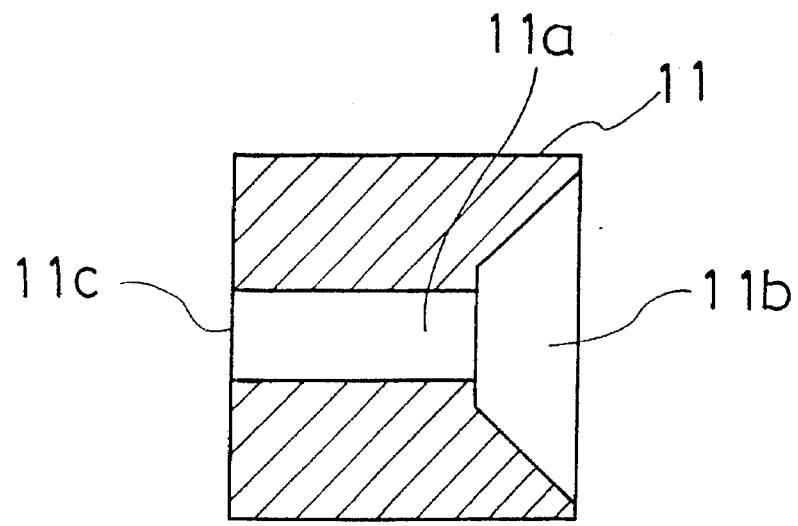
FIG. 3 is a sectional view of the single seal block shown in FIG. 1.

As shown in FIG. 3, at the center portion of the seal block 11, a fluid channel 11a is provided in an identical direction with a longitudinal direction of a fluid supply hole, and the shape of the abutting side 11b which abuts against the rear end of the oil-through-drill 1 is formed conical, and this outer circumference of the rear end of the oil-through-drill 1 adheres close to the conical inner circumference of the seal block. The fluid pressure action face side 11c of the seal block 11 is formed plane and receives the fluid pressure. The material of the seal block 11 may be a metal or a metal-partially including one, but it is preferable to use a resin easy to be deformed elastically. In this embodiment, a gum to be deformed elastically is used.

Figure 4:
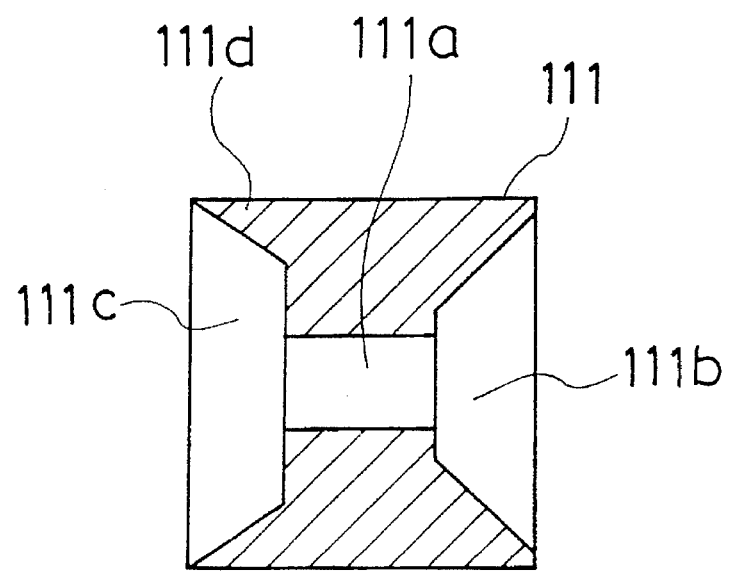
FIG. 4 is a sectional view of a seal block having a conic operation surface.
Figure 5:
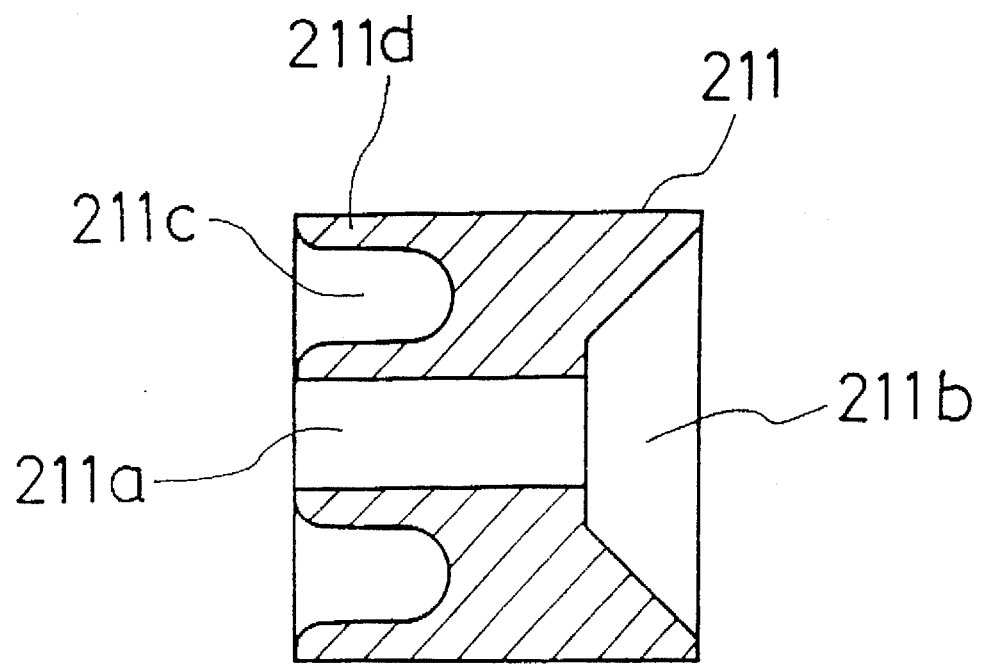
FIG. 5 is a sectional view of a seal block having an annular groove-like operation surface.

The shape of the seal block is shown in FIG. 4 as 111 indicative of the same, which comprises a diameter enlarging portion which is enlarged in response to the pressure of a cutting oil. At the center portion of the seal block 111, a fluid channel 111a is formed in the identical direction with the longitudinal direction of the fluid supply channel hole, and the shape of the abutting face side 111b of the seal block 11, which abuts against the rear end of the oil-through-drill 1, is formed conical, and the outer circumference of the oil-through-drill 1 adheres close to the conical inner face. Further, since the shape of the seal block 111 in the fluid pressure action face side 111c is formed conical, it adheres close to the inner surface of the fluid supply hole of the oil-through-drill 1 by the enlarging of the action face of outer circumference 111d. And, as in a seal block 211 shown in FIG. 5, it may be recommendable to make easier to enlarge the diameter due to the action of fluid pressure in the action-face-outer-circumference 211d, by forming a fluid channel 211a in an identical direction with the longitudinal direction of the fluid supply hole and the shape of an action face side 211c of the fluid pressure in an annular groove.

Figure 6:
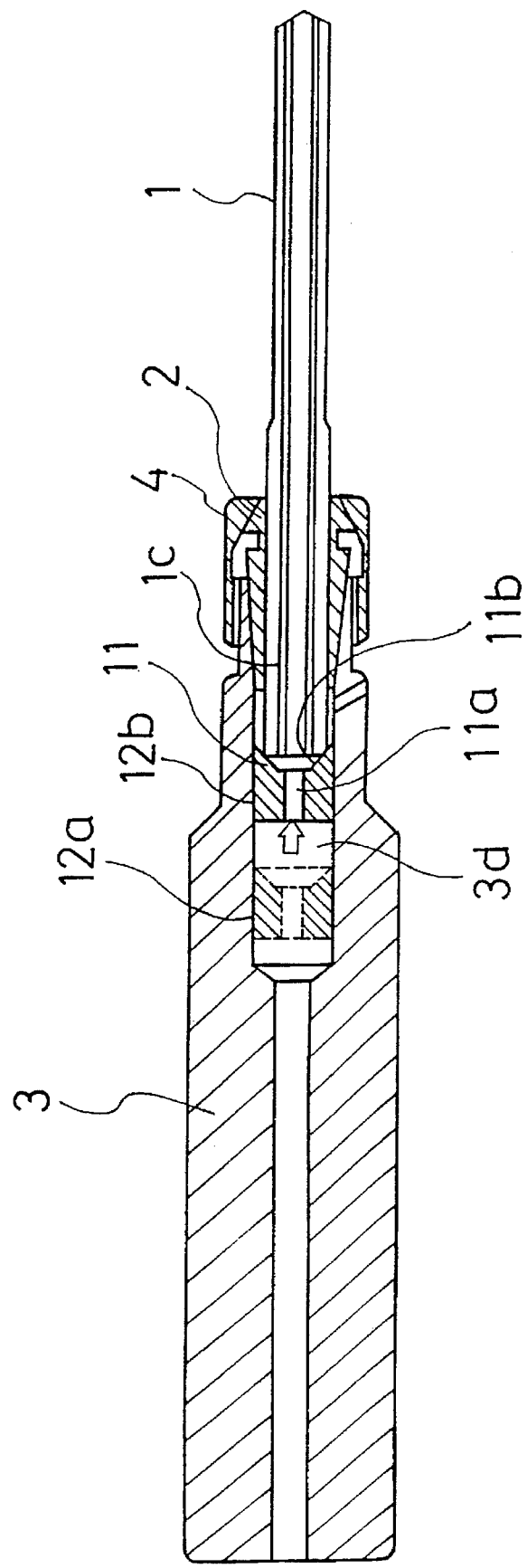
FIG. 6 is a sectional view showing the sliding status of the seal block.
Figure 7:
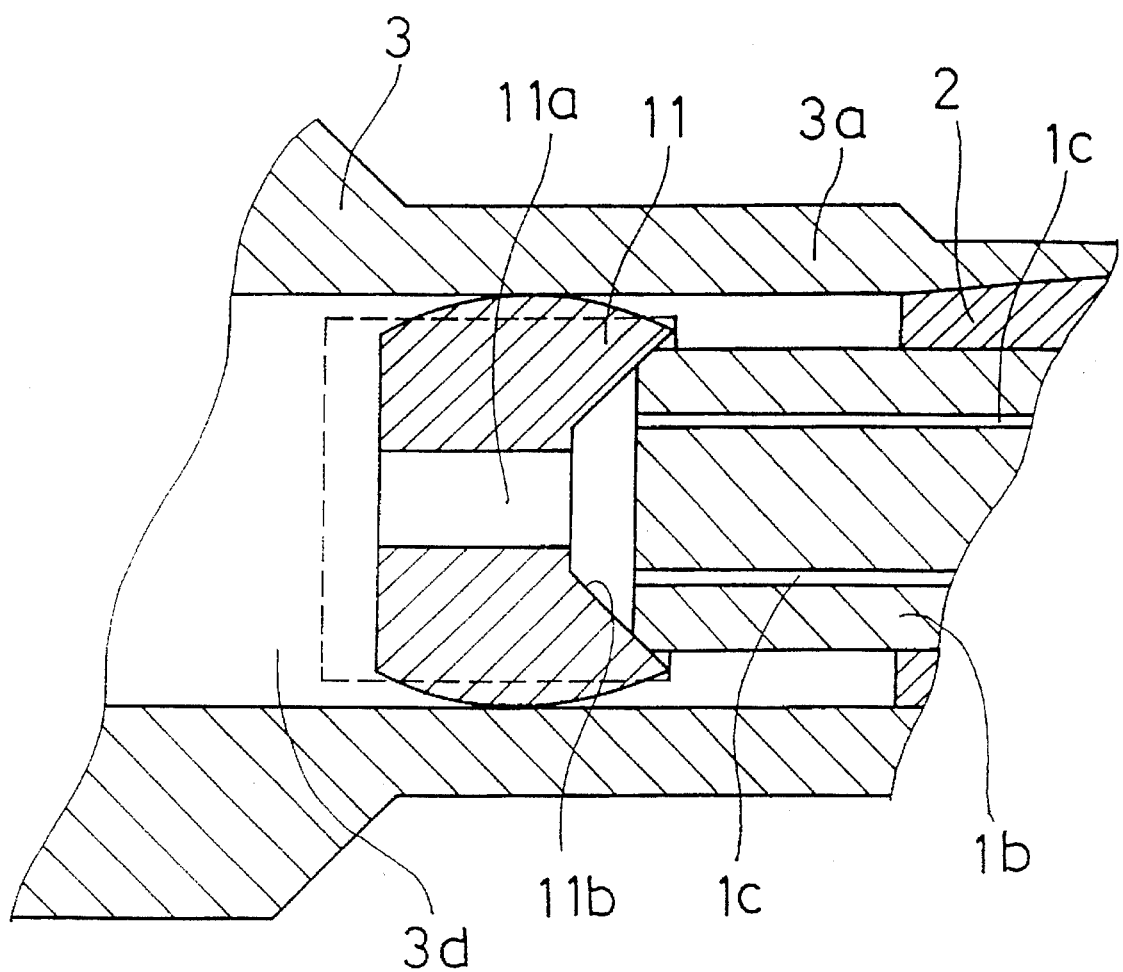
FIG. 7 is a sectional view showing a close adhesion status of a seal block.

In FIG. 6, a status where the seal block 11 slides in the fluid supply hole 3d of the drill chuck 3 toward the axial direction of the fluid supply hole is shown. In case the cutting oil is not supplied, the seal block 11 stays at an arbitrary position 12a in the fluid supply hole 3d. When the cutting oil is supplied, the seal block 11 is quickly slidden by the pressure of the supplied cutting oil toward the oil-through-drill 1 held, and reaches the position 12b where the conical inner surface of the seal block 11 adheres close to the outer circumference of the rear portion of the oil-through-drill 1 within the fluid supply hole 3d. The seal block 11 continues to be pressed by the pressure action of the cutting oil after the close adhesion to the rear portion of the oil-through-drill 1, so that it is elastically deformed as shown in FIG. 7 to be compressed in an axial direction and enlarged in a diameter direction. By this diametral enlarging, the seal block 11 adheres close to the inner surface of the drill chuck 3.

Further, at the center portion of the seal block 11 a fluid channel 11a is provided in an axial direction, so that the supplied cutting oil is supplied through the fluid supply channel 11a to the close adhesion portion where the rear portion of the oil-through-drill 1 and the abutting face side 11b of the seal block 11 adhere a close, then the cutting oil is carried to the fluid channel 1c. Accordingly, such regulation as the flowing amount of the fluid to the fluid channel 1c is in maximum, and the flowing amount to the gap portion between the straight shank portion 1b of the oil-through-drill 1 and the fluid supply hole 3d of the drill chuck 3 is in minimum can be carried out.

Figure 8:
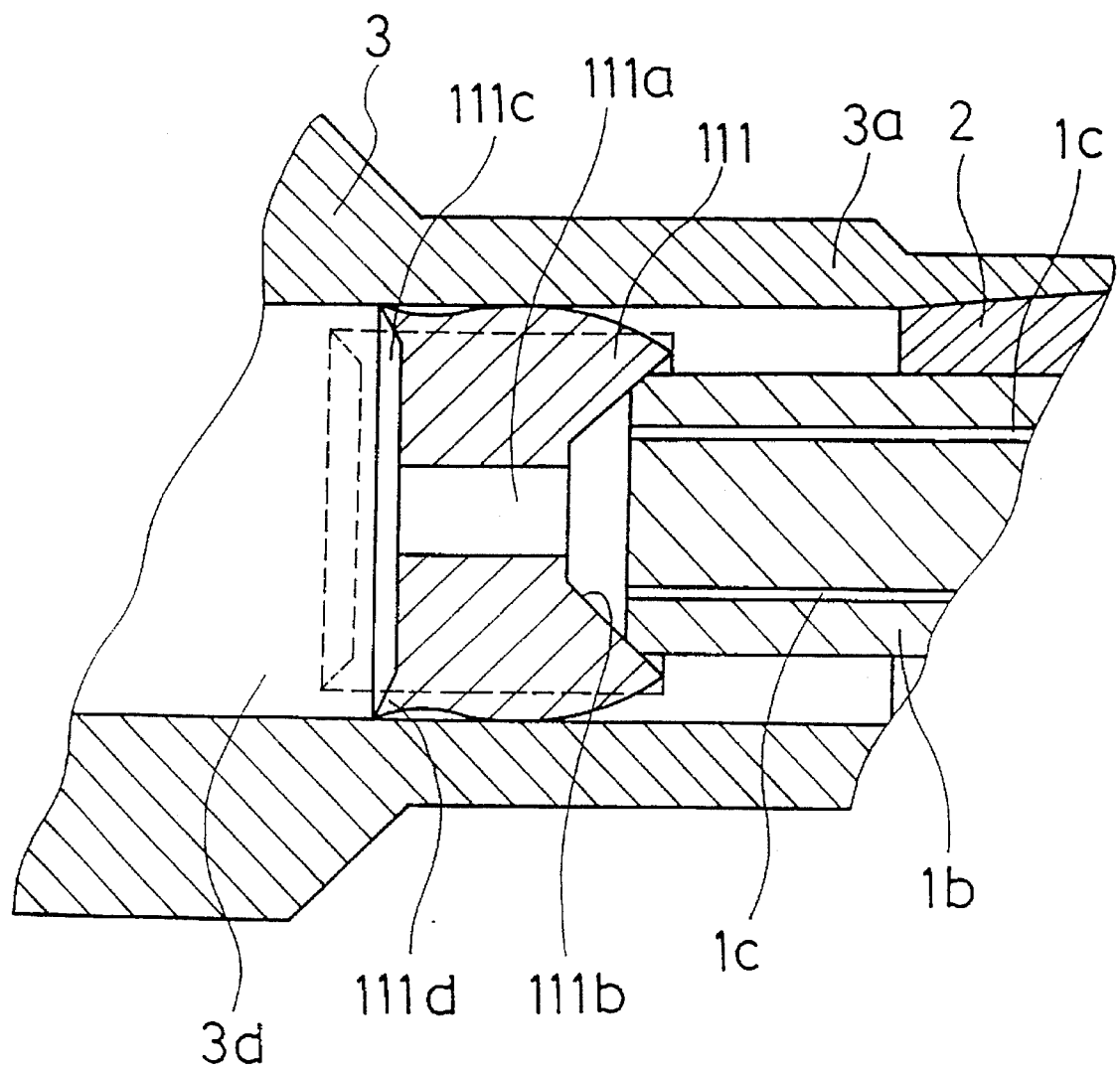
FIG. 8 is a sectional view showing a close adhesion status of a seal block.

On the other hand, in the seal block 111 shown in FIG. 4, as shown in FIG. 8 the seal block 111 is compressed in an axial direction and enlarged in a diametral direction, further the diameter enlarging portion 111d is also enlarged to increase the close adhesion to the inner surface of the fluid supply 3d of the drill chuck 3. The seal block shown in Fig. 5 functions as well as in FIG. 8.

As explained above, in the drill chuck 3 illustrated in this embodiment, the pressure of the cutting oil to be supplied acts on the action face side 11c, 111c and 211c of the seal block 11, 111 and 211 respectively, the seal block slides in the fluid supply hole 3d of the drill chuck 3 and adheres close to the opening end of the fluid channel 1c of the oil-through-drill 1. That is, the gap between the opening end of the fluid channel 1c and the inner surface of the fluid supply hole 3d of the oil-through-drill 1 is sealed, and the fluid channel 1c of the oil-through-drill 1 is in communication with the fluid supply hole 3d of the drill chuck 3, accordingly, the volume of the cutting oil supplied to the fluid supply hole 3d and spouted from the tip end 1a of the tool of the oil-through-drill 1 becomes in maximum and the volume of the fluid flowing to the gap between the oil-through-drill 1 and the fluid supply hole 3d becomes in minimum. Accordingly, the leak of the fluid from the split grooves of the collet, the gaps such like between the collet and the oil-through-drill or the collet and the drill chuck is prevented to guarantee a necessary supply volume of the fluid to the tip end 1a of the tool. Eventually, the cutting process is carried out smoothly.

Subsequently, the second embodiment of the present invention will be explained hereinafter. In this embodiment, as shown in FIGS. 9(a) and 9(b), a seal block 31 is used in the form of the following preparation, that is, the abutting face side 31b and the action face side 31c of the seal block 31 are formed conic, at the center portion thereof is provided a fluid channel 31 as a main channel by piercing in front and in rear, and in the outer diametral portion a groove 31d as a sub-channel is provided also by piercing in front and in rear.

When the seal block 31, as well as in the first embodiment, receives the pressure of the cutting oil on the action face side 31c, the abutting face side 31b adheres close to the rear end of the oil-through-drill 1, and the seal block 31 is compressed in the axial direction and expanded in the diametral direction to adhere close to the inner surface of the fluid supply hole 3d of the drill chuck 3. And the cutting oil passes the seal block 31 through the fluid channel 31a and is supplied to the close adhesion portion between the rear portion of the oil-through-drill 1 and the abutting face side 31b of the seal block 31, the cutting oil is forwarded to the fluid channel 1c of the oil-through drill 1. Further, the cutting oil passes the groove 31d of the seal block 31 and is supplied in the necessary volume thereof to the gap between the oil-through-drill 1 and the fluid supply hole 3d.

Further, as shown in FIGS. 10(a) and 10(b), the abutting face side 32b and the action face side 32c of the seal block 32 are formed conic, at the center portion thereof is provided a fluid channel 32a as a main channel by piercing in front and in rear and on the outer diametral portion a plane portion 32d perpendicular to the diametral direction of the seal block 32 is formed. In this case, a necessary volume of the cutting oil is supplied to the fluid channel 1c of the oil-through-drill 1 and to the gap between the oil-through-drill 1 and the fluid supply hole 3d of the drill chuck 3 from the close adhesion portion between the rear portion of the oil-through-drill 1 and the abutting face side 32b and from the groove 33d opened to the fluid supply hole 3d at the above close adhesion portion respectively. In the second embodiment thus constituted of the present invention, the cutting oil supplied as well as in the first embodiment, passes the fluid channels 31a, 32a and 33a and is supplied to the close adhesion portions between the rear portion of the oil-through-drill 1 and the abutting face sides 31b, 32b and 33b of the seal block 11, and the cutting oil is carried to the fluid channel 1c of the oil-through-drill 1.

In addition, the cutting oil volume to be carried to the gap between the oil-through-drill 1 and the fluid supply hole 3d of the drill chuck 3 through the groove 31d, the plane portion and the groove 33d can be regulated. By this regulation, the flowing volume to be carried to fluid channel 1c of the oil-through-drill 1 can also be regulated. As mentioned above, since the cutting oil regulated is carried to the gap between the oil-through-drill 1 and the fluid supply hole 3d of the drill chuck 3d, the chips or the dust which are apt to adhere to such as split grooves in communication with the gap can be cleared off. In this case, since the flowing volume of the cutting oil from the split grooves is regulated as mentioned above, which does not cause the volume to be carried to the fluid channel 1c of the oil-through-drill 1 to become insufficient.

In addition, by making use of the nature of the seal blocks 31, 32 and 33 due to the oil pressure applied thereto that it is distorted in such a manner as compressing in the axial direction and enlarging in the diametral direction, in case the groove 31d, the plane portion 32d and the groove 33d are sealed, the cutting oil volume to be supplied to the split grooves of the collet can be regulated by the dimensions of the pressure of the cutting oil too.

Figure 12:
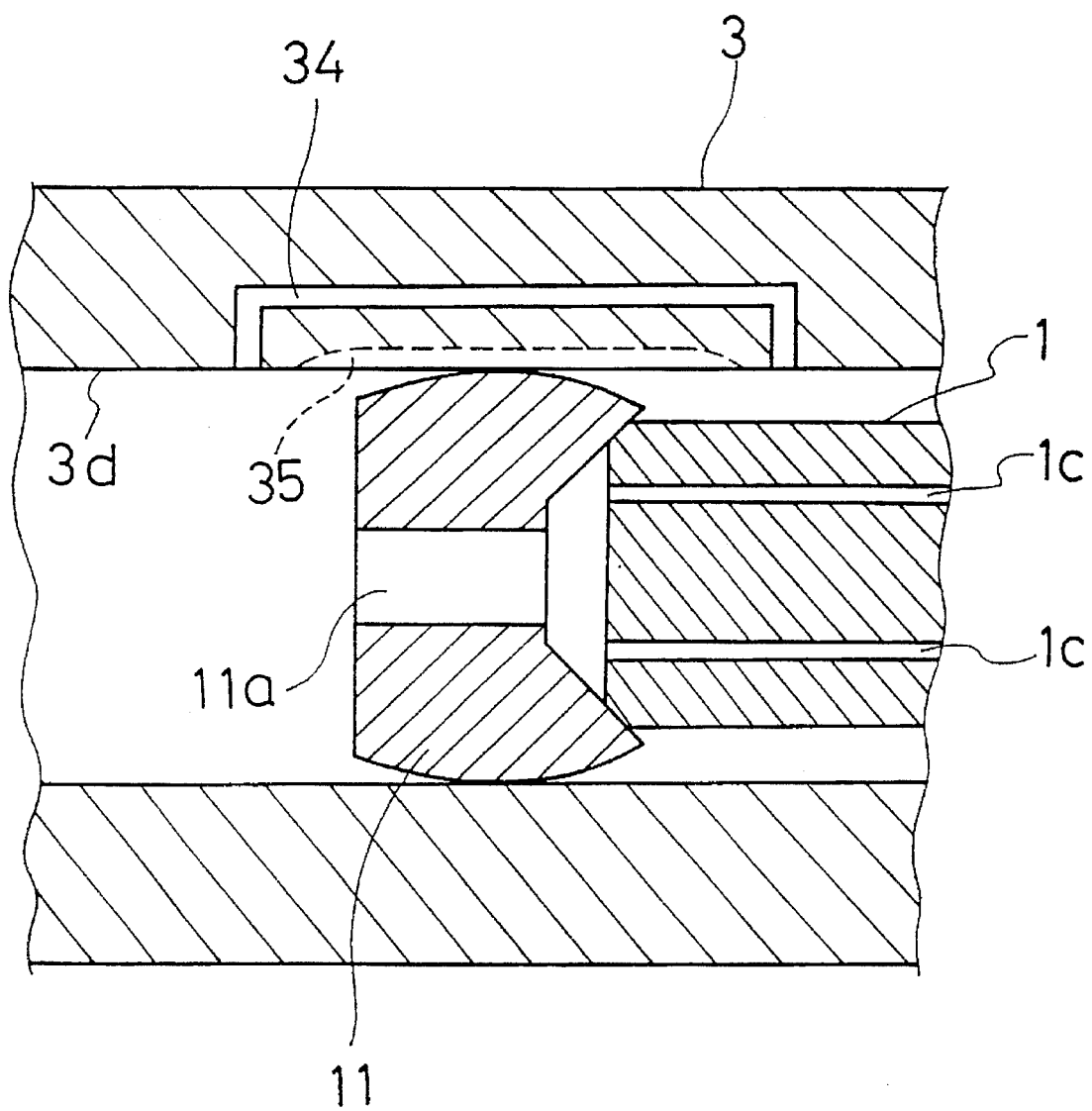
FIG. 12 is a schematic view of the setting status of a seal block of a tool holder in section according to the third embodiment of the present invention.

Next, the third embodiment of the present invention is explained referring to the FIG. 12. In this embodiment, a sub-channel, which supplies the necessary volume of the cutting oil to the gap between the oil-through-drill 1 and the fluid supply hole 3d of the drill chuck 3 as shown in the second embodiment of the present invention, is provided in the side of the drill chuck. The sub-channel, as shown in solid line, may be a by-pass channel 34 formed between two points on the wall of the fluid supply hole 3d by making detour the seal block 11, or as shown in a dotted line, may be a groove 35 formed in the seal block 11 in front and in rear. In any case, as well as in the second embodiment, by the fluid channel 11a of the seal block 11, the cutting oil volume to be carried to the fluid channel 1c of the oil-through-drill 1 can be regulated and through the by-pass channel 34 and the groove 35 etc. the cutting oil volume to be carried to the gap between the oil-through-drill 1 and the fluid supply hole 3d of the drill chuck 3 can be regulated.

Accordingly, the functions and effects derived therefrom are identical with the second embodiment, so that the explanation thereof is omitted.

Figure 13:
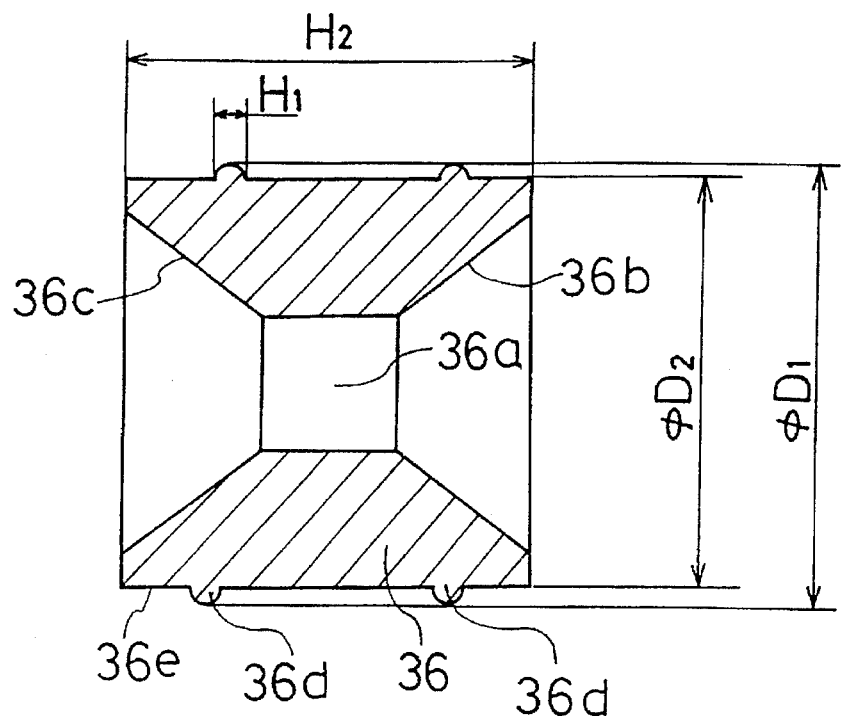
FIG. 13 is a sectional view of a seal block according to the fourth embodiment of the present invention.
Figure 14:
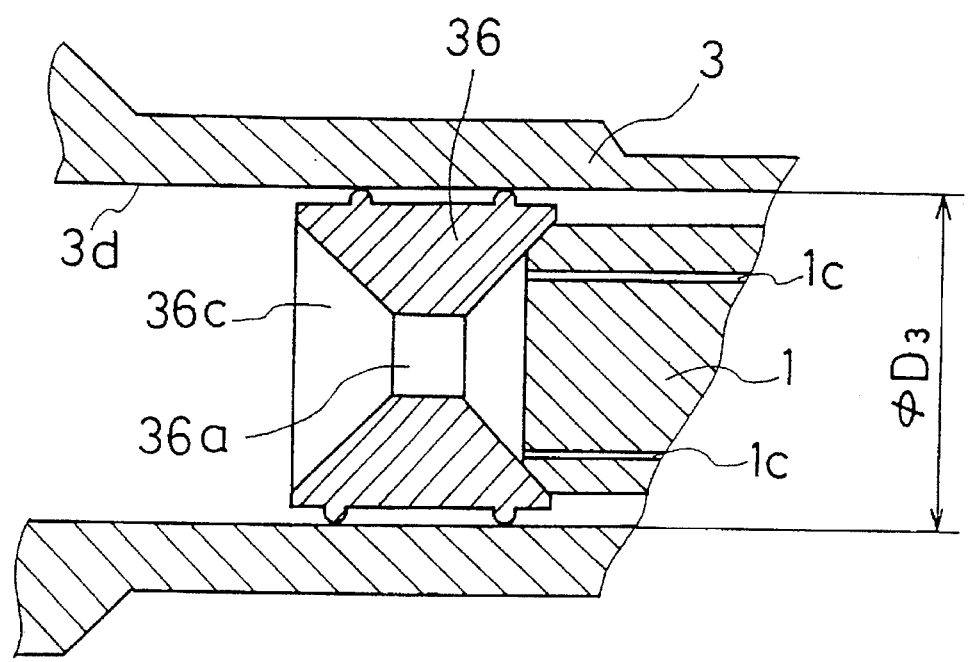
FIG. 14 is a sectional view of the setting status of the seal block shown in FIG. 13 to the tool holder.

Next, the fourth embodiment of the present invention is explained referring to FIGS. 13 and 14. In this embodiment, the seal block 36 is formed conic in its abutting face side 36b and its action face side 36c and at the center portion thereof a fluid channel 36a as a main channel is provided in front and in rear. Further, on the outer diametral portion 36e, a projection 36d is provided. When defining the diameter of the projection 36d as D1, the diameter of the outer diametral portion 36e of the seal block 36 as D2 and the diameter of the fluid supply hole 3d as D3, the seal block is prepared in such a manner as the dimensional relationship between them becomes D1>D3>D2. Further, the projection 36d has a dimension of H1 as the width in front and in rear, which is quite small compared with the total width of H2 of the seal block 36. For reference, as to the configuration of the projection 36d may be annular or helical, in addition, not necessarily it has not to be all around the outer diametral portion and it can be partial convexes.

In the fourth embodiment of the present invention thus constituted, when the seal block 36 is inserted into the fluid supply hole 3d of the drill chuck 3, the projection 36d having a diameter a little larger than the fluid supply hole 3d slides while being distorted, so that the friction due to such distortion prevents the seal block from removing when assembling. And, the width H1 is small and since the outer diametral portion 36e of the seal block 36d is smaller than the fluid supply hole 3d in diameter, there is generated no such friction force as influencing badly assembling or sliding, and even if the dimensions of the diameter D1 of the projection of 36d and the diameter D2 of the outer diametral portion 36e are varied unevenly, the influence to the assembling facility and the slidability is small, so that the common difference of the dimension of the diameter D1 of the projection of 36d and the diameter D2 of the outer diametral portion 36e can be settled great compared with the first embodiment.

Further, as well as in the first embodiment, the abutting face side of the seal block 36 adheres close to the rear portion of the oil-through-drill 1 receiving the cutting oil pressure on its action face side, the diameter D1 of the projection 36d is enlarged by being compressed in an axial direction, thereby the close adhesion against the inner surface of the fluid supply hole 3d is further increased and the diameter D2 of the outer diametral portion is also enlarged to adhere close to the inner surface of the fluid supply hole 36d. Accordingly, as mentioned above, even if the common difference of the dimension of the diameters D1 and D2 is settled greater compared with the first embodiment, as well as in the first embodiment, the high-pressured cutting oil supplied to the fluid supply hole 36d is spouted merely from the tip end 1a of the tool and the fluid volume to be flown into the gap between the oil-through-drill 1 and the fluid supply hole 3d of the drill chuck 3 can be regulated in minimum. Thereby, it has the same functions and effects as in the first embodiment, in case the seal block 36 is made of a resin, the finishing process is not necessary, which causes a cost down. In addition, in assembling process, it increases not only the assembling facility by avoiding the removal of members but also the using facility.

For reference, it is possible to work the invention by combination of the fourth embodiment with the second embodiment or the third embodiment.

Figure 15:
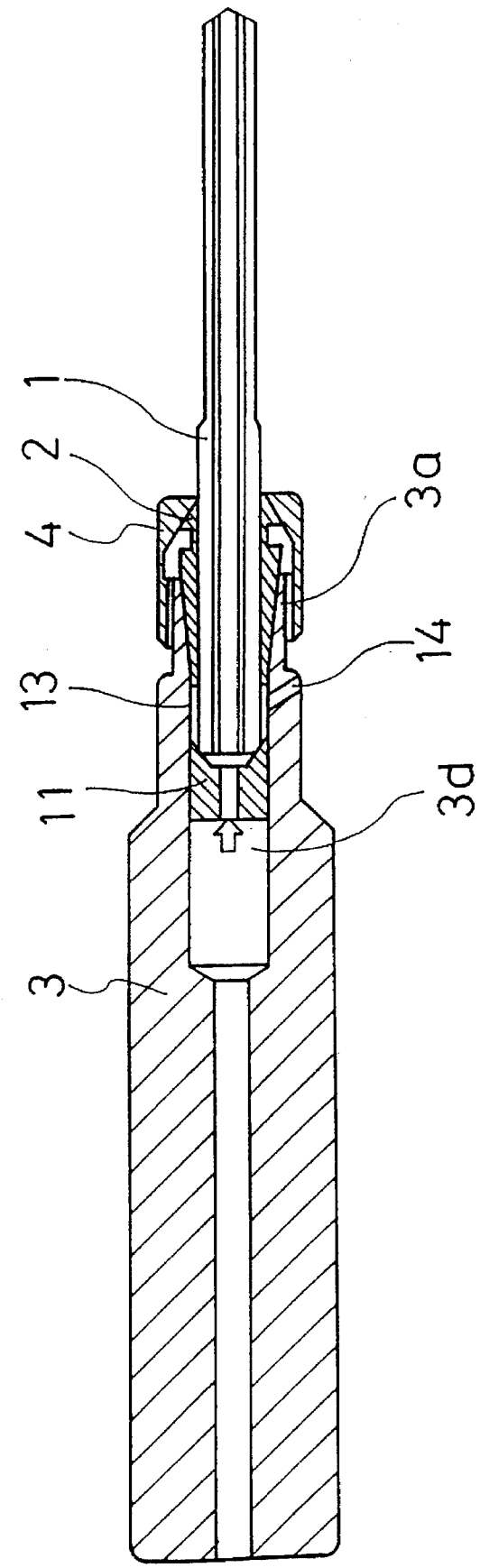
FIG. 15 is a sectional view of a pressure reduction means in the fifth embodiment of the present invention.
Figure 16:
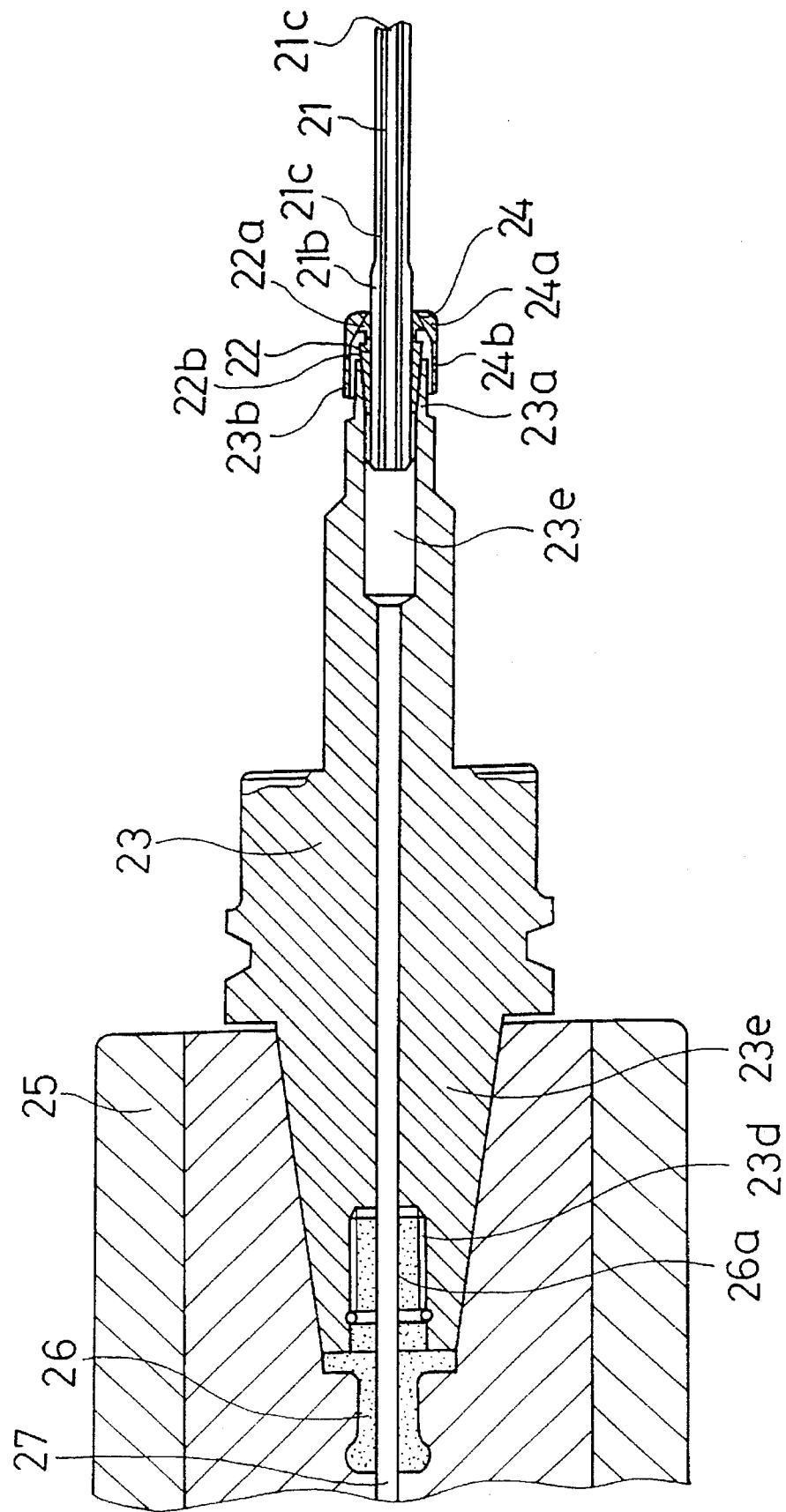
FIG. 16 is a sectional view of a conventional tool holder.
Figure 17:
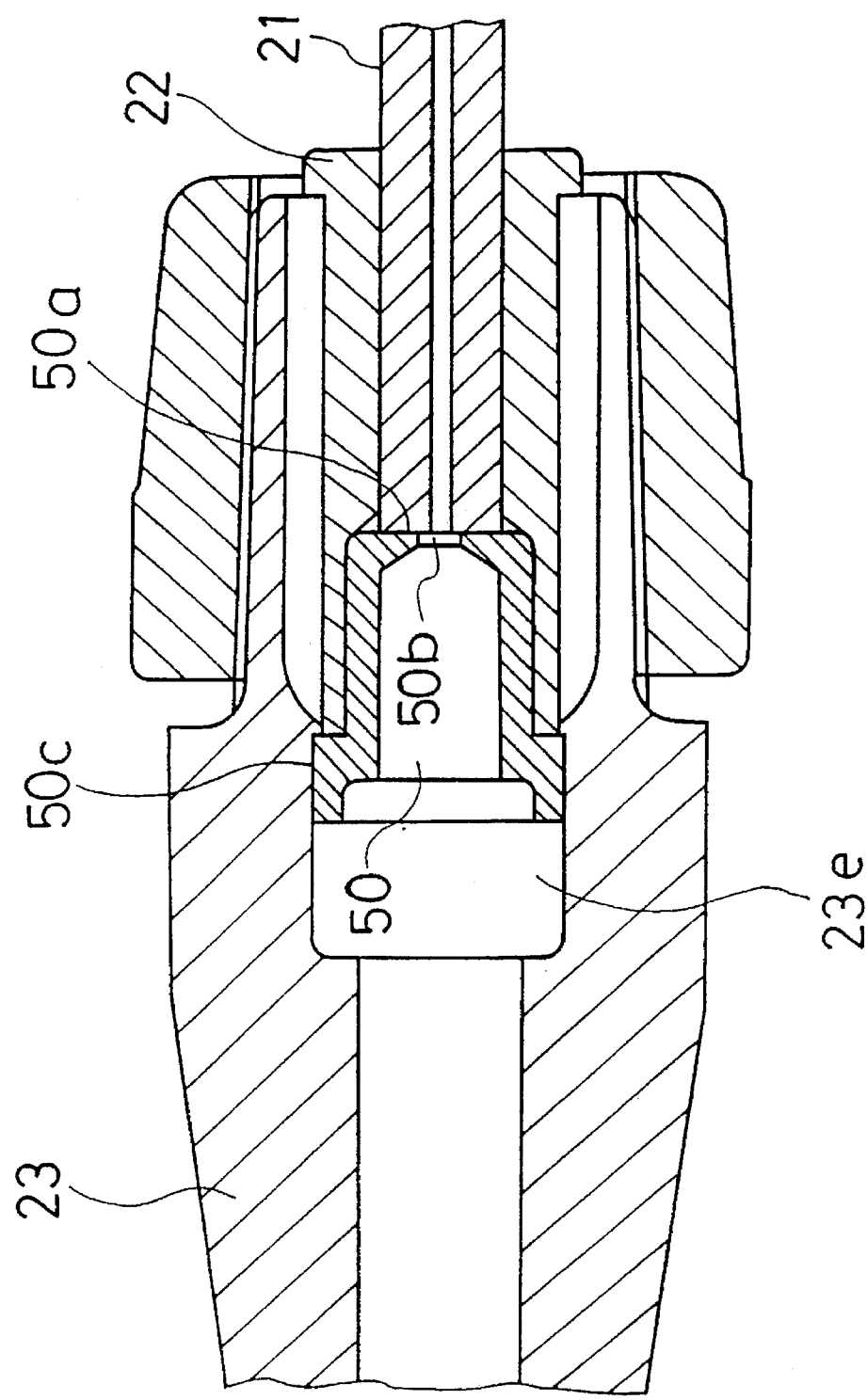
FIG. 17 is a sectional view of the essential portion of a tool holder having a conventional oil seal packing.
Figure 18:
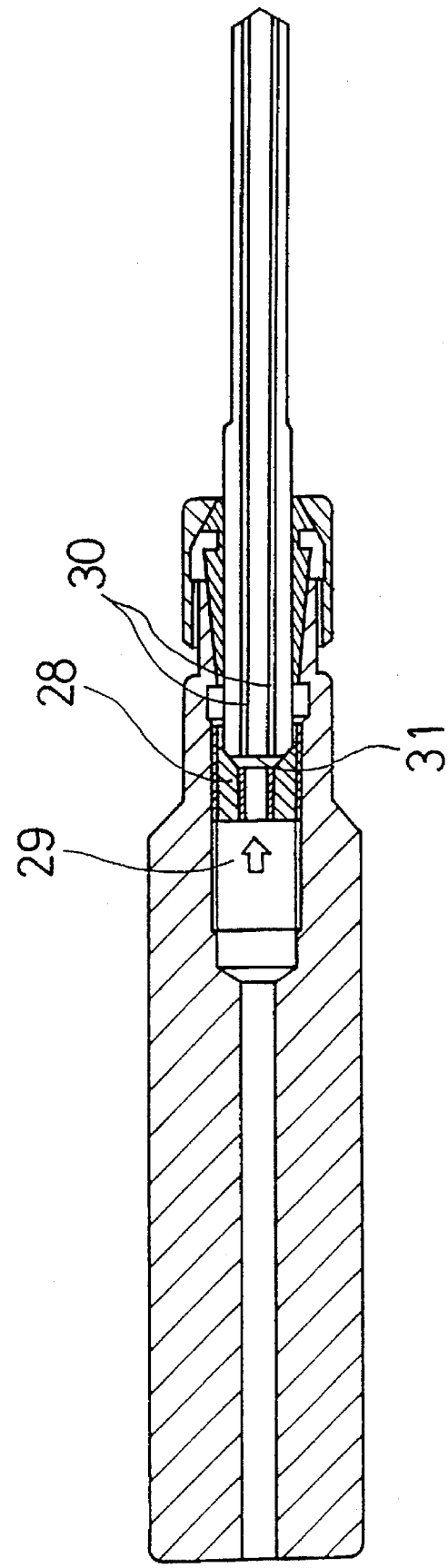
FIG. 18 is a sectional view of a conventional regulatable oil seal packing.

Subsequently, the fifth embodiment of the present invention is explained as follows. In the tool holder illustrated in the fifth embodiment, in addition to the constitution of the first embodiment, as shown in Fig. 15, in a space 13 in the fluid supply hole 3d, which is formed by the tool holding portion constituted with the collet 2, the tip end opening 3a of the drill chuck 3 and a rock nut 4 and the seal block 11, a fine channel 14 is provided to be in communication with the outside of the drill chuck 3. Thereby, the volume reduction i.e. the air-pressure increase in the space 13, which is caused by the sliding of the drill chuck 3 in the fluid supply hole 3d. The cutting oil is supplied under a high pressure, and since the sliding of the seal block 11 is quick, so that the seal block adheres close to the rear end portion of the oil-through-drill 1 prior to the process of spouting the cutting oil. After the close adhesion of the seal block 11, there is no entry of the fluid into the space 13.

This embodiment also can be carried out in combination with any one of the first—fourth embodiment.

As explained above, in the drill chuck of this embodiment, the pressure of the cutting oil acts on the end face of the seal block, so that the seal block slides in the fluid supply hole of the drill chuck and appropriately adheres close to the end of the opening of the fluid channel of the oil-through-drill. That is, the gap between the opening end of the fluid channel of the oil-through-drill and the inner surface of the fluid supply hole of the drill chuck is sealed and flowing volume of the fluid from the fluid supply hole to the fluid channel of the oil-through-drill is secured in a necessary volume.

Further, besides the main channel introducing the fluid from the fluid supply hole of the drill chuck to the fluid channel of the oil-through-drill, a sub channel is provided in the seal block or the drill chuck, thereby the fluid volume to be carried to the gap between the outer surface of the oil-through-drill and the inner surface of the fluid supply hole of the drill chuck can be regulated, and by this regulated volume of fluid the chips or dusts adhered to such as split grooves of the collet can be removed. In this case, the cutting oil flown from the split grooves of the collet is what is regulated as mentioned above, there is no risk for the cutting oil volume to be supplied to the fluid channel of the oil-through-drill to be in shortage.

Still further, since the end face of the seal block, on which the cutting oil pressure acts after the seal block slides in the fluid supply hole of the drill chuck and adheres close to the rear end of the oil-through-drill, is enlarged in the diameter in accordance with the fluid pressure, the close adhesion between the inner surface of the fluid supply hole and the enlarged diametral portion of the seal block is increased, thereby the cutting oil is prevented from leaking in surplus between the inner surfaces of the seal block and the drill chuck.

In addition, since the compressed air in the space between the collet and the seal block which is generated when the seal block slides in the fluid supply hole of the drill chuck is exhausted through the fine channel pierced in the drill chuck, it is prevented that the pressure of the compressed air against the seal block overwhelms the cutting oil supply pressure and the sliding in the fluid supply hole is influenced badly, thereby the close adhesion between the rear end of the oil-through-drill and the seal block is decreased.

What is claimed is:

1. A tool holder holding a tool at the opening of the tip end thereof, with which a fluid supply hole is in communication, through a collet and wherein a fluid can be supplied from the fluid supply hole to a fluid channel of the tool, the fluid supply hole is provided with a regulating means to regulate the flowing amount of the fluid to a fluid channel of the tool and the flowing amount of the fluid to a gap between the inner surface of the fluid supply hole and an outer surface of the tool;

wherein the regulating means is a seal member which abuts against the end of the tool by sliding in the fluid supply hole in response to the fluid pressure supplied in the fluid supply hole and abuts also against the inner surface of the fluid supply hole.

2. A tool holder according to claim 1, wherein said seal member is provided with a portion to be enlarged in its diameter due to the pressure acting on the seal member, which adheres close to the inner surface of the fluid supply hole.

3. A tool holder holding a tool at the opening of the tip end thereof, with which a fluid supply hole is in communication, through a collet, and wherein a fluid can be supplied from the fluid supply hole to a fluid channel of the tool, the fluid supply hole is provided with a regulating means to regulate the flowing amount of the fluid to a fluid channel of the tool and the flowing amount of the fluid to a gap between the inner surface of the fluid supply hole and an outer surface of the tool;

wherein the regulating means is a seal member provided with a main channel introducing the fluid to the fluid channel of the tool, in which a by-pass channel introducing the fluid to the gap between the inner surface of the fluid supply hole and the outer surface of the tool is formed on at least one of the seal member and the tool holder.

4. A tool holder according to claim 3, wherein the tool holder is provided with a pressure reduction means which prevents the pressure increase in accordance with the sliding of the seal member due to the volume reduction of a space in the fluid supply hole formed by the seal member and the tool holding portion.

5. A tool holder according to claim 3, wherein said seal member is provided with a portion to be enlarged in its diameter due to the pressure acting on the seal member, which adheres close to the inner surface of the fluid supply hole.

6. A tool holder according to claim 4, wherein said seal member is provided with a portion to be enlarged in its diameter due to the pressure acting on the seal member, which adheres close to the inner surface of the fluid supply hole.

7. A tool holder holding a tool at the opening of the tip end thereof, with which a fluid supply hole is in communication, through a collet, and wherein a fluid can be supplied from the fluid supply hole to a fluid channel of the tool, the fluid supply hole is provided with a regulating means to regulate the flowing amount of the fluid to a fluid channel of the tool and the flowing amount of the fluid to a gap between the inner surface of the fluid supply hole and an outer surface of the tool;

wherein the tool holder is provided with a pressure reduction means which prevents the pressure increase in accordance with the sliding of the seal member due to the volume reduction of a space in the fluid supply hole formed by the seal member and the tool holding portion.

8. A tool holder according to claim 7, wherein said seal member is provided with a portion to be enlarged in its diameter due to the pressure acting on the seal member, which adheres close to the inner surface of the fluid supply hole.

9. A tool holder according to either one of claims 2–8, wherein on an outer diametral portion of the seal member a projection having a diameter larger than the diameter of the fluid supply hole is provided.

* * * * *